Dec. 12, 1950 R. S. PYLE 2,533,398
SELECTIVE SHAFT POSITIONING CONTROL
Filed May 21, 1946 2 Sheets-Sheet 1

INVENTOR.
ROSS S. PYLE
BY John J. Logan
ATTORNEY

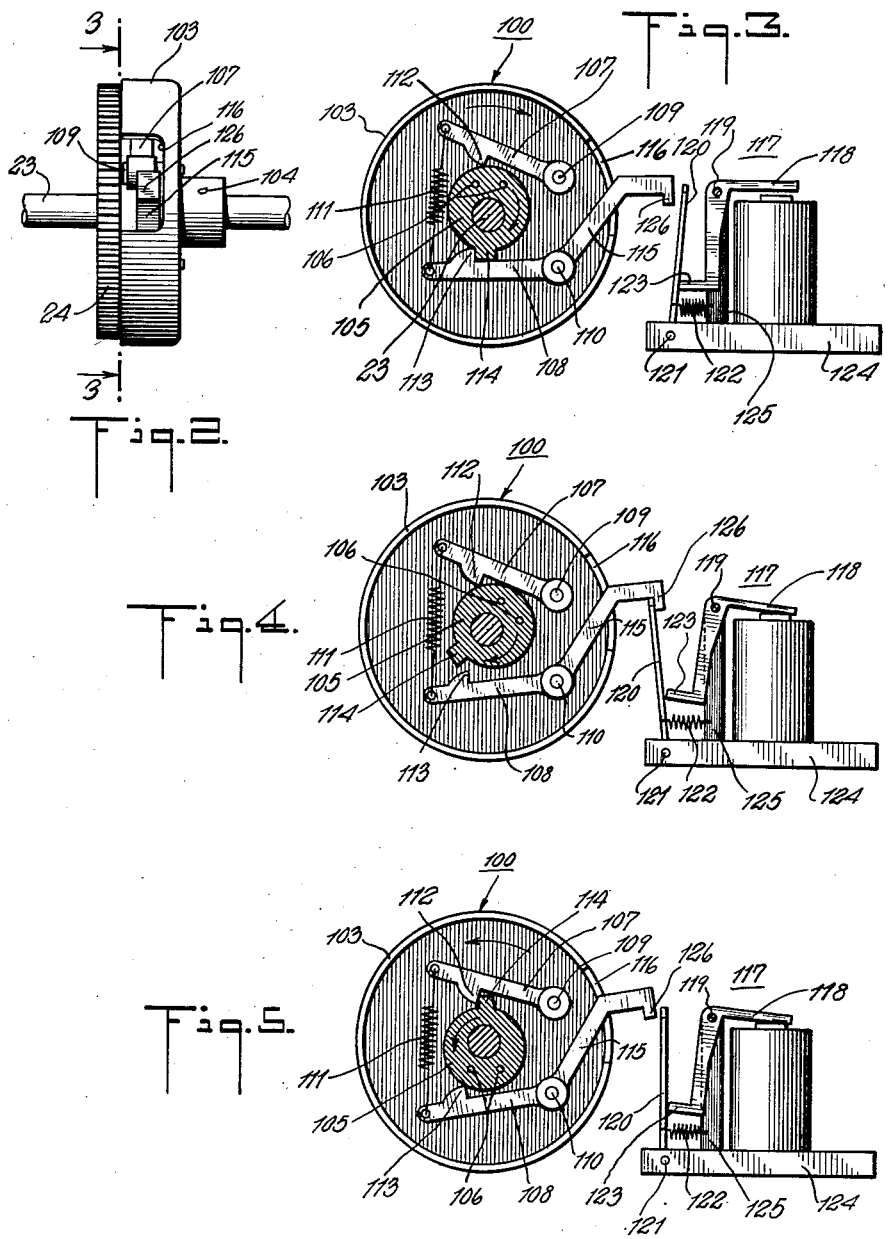

Patented Dec. 12, 1950

2,533,398

UNITED STATES PATENT OFFICE 2,533,398

SELECTIVE SHAFT POSITIONING CONTROL

Ross S. Pyle, Cedar Rapids, Iowa, assignor to Collins Radio Company, Cedar Rapids, Iowa, a corporation of Iowa Application May 21, 1946, Serial No. 671,202

9 Claims. (Cl. 192—142)

This invention relates to automatic rotational positioning of control shafts and more especially to improvements in automatic radio control systems.

A principal object of the invention is to improve the accuracy of a shaft control arrangement of the type disclosed, for example, in U. S. Letters Patent No. 2,285,415 and Reissue Letters Patent Re. 22,574.

There is disclosed in said reissue patent an automatic selective shaft positioning system, wherein a shaft to be controlled, for example the tuning control shaft of a radio transmitter, is associated with two main control units designated respectively as a stop ring unit and a selector cam unit. The selective stopping of the shaft is determined by the selective stopping of the stop ring unit and the cam unit, through the intermediary of a series of coacting pivoted pawls. In this prior arrangement, there are an equal number of cams, stop rings and selector pawls, there being one cam for each pawl and for each stop ring. Each of these elements, namely stop ring, selector cam and selector pawl, for convenience can be referred to as a stop selector set, there being one such set for each angular position to which the control shaft is to be selectively set. In this type of device, the first selective step consists in driving the stop ring drum to a "home" or standard reference position; then rotating the cam unit to selectively position one of the selector pawls. The next step is the reversal of rotation of the stop ring unit (without reversal of the previously set cam drum), until the previously selected pawl engages with a stop shoulder on the appropriate stop ring allotted to the desired selective position of the shaft to be controlled. It will be understood that these stop rings can be preset manually in any desired angular orientation around their common axis in accordance with the desired angular settings of the control shaft, and they can be locked in these preset positions.

With such an arrangement, it is necessary to provide a reversible electric motor for driving the stop ring drum and the cam drum. Heretofore, the stopping of the cam drum has been accomplished by using a motor which responds as fast as possible to the opening of its power circuit, and to the reversal of current through its directional control or field windings. However, even with such an arrangement, the motor tends to coast down to its position of rest before it begins its reverse movement. Thus, while a cam selector circuit may be instantaneously controlled by using an electromagnetic relay which in turn controls the directional windings of the motor, it is not always possible to make sure that the cam drum stops within the desired time increment after cam selection is effected. In other words, the desired accuracy of stopping of the cam drum, and the desired accuracy of reversal of rotation of the stop ring drum, are not always obtainable because of the inertia of the common driving motor and the associated shafting. While special motors may be constructed to achieve the necessary stopping and reversal accuracy, and while three-phase automatic control motors provide fairly satisfactory accuracy, the problem becomes very much more acute when it is attempted to drive the selector mechanism by an ordinary single phase motor. Even with three-phase motors, a plurality of revolutions of the drive shaft usually take place before accurate stopping and reversal occur. With single phase motors the stopping and reversal are comparatively slow, requiring many revolutions before the motor comes to rest and before it reverses its direction of rotation.

Accordingly, it is a principal object of this invention to provide an improved arrangement for stopping a selector shaft within less than one revolution after the circuit of its driving motor has been opened, and for insuring reversal of the shaft rotation substantially immediately upon reversal of the driving motor.

Another object relates to a shaft positioning control arrangement of the type having a rotatable selector drum which is adapted to undergo one direction of rotation to bring it to a home position and then to a reverse rotation to bring it to selective stopping position; in conjunction with a power driving motor and a special unit between the motor and selector drum for substantially instantaneously stopping the drum upon the opening of the motor circuit regardless of the continued coasting of the motor.

Another feature relates to a selective system of the type disclosed in said Reissue Patent Re. 22,574, wherein a single phase motor can be used for driving the various parts.

A further feature relates to a novel form of cutout device for controlling the connection of the selector shaft to, and controlling its disconnection from, the main driving shaft.

A still further feature relates to the novel organization, arrangement and relative location and interconnection of parts which cooperate to provide an improved automatic control system for radio apparatus and the like.

Other features and advantages not particularly enumerated will be apparent after a consideration of the following detailed descriptions and the appended claims.

In the drawing which represents one preferred embodiment.

Fig. 2 is a front view of the novel cutout device used in the system of Fig. 1.

Fig. 3 is a sectional view of Fig. 2, taken along the line 3—3 thereof and viewed in the direction of the arrows.

Fig. 4 is a cross-sectional view similar to that of Fig. 3, but showing a different relation of the parts to cause disengagement of the motor drive shaft from the selector shaft.

Fig. 5 is a view similar to that of Figs. 3 and 4, but with the parts in a different position corresponding to reverse rotation of the motor shaft and the selector shaft.

Figure 1:
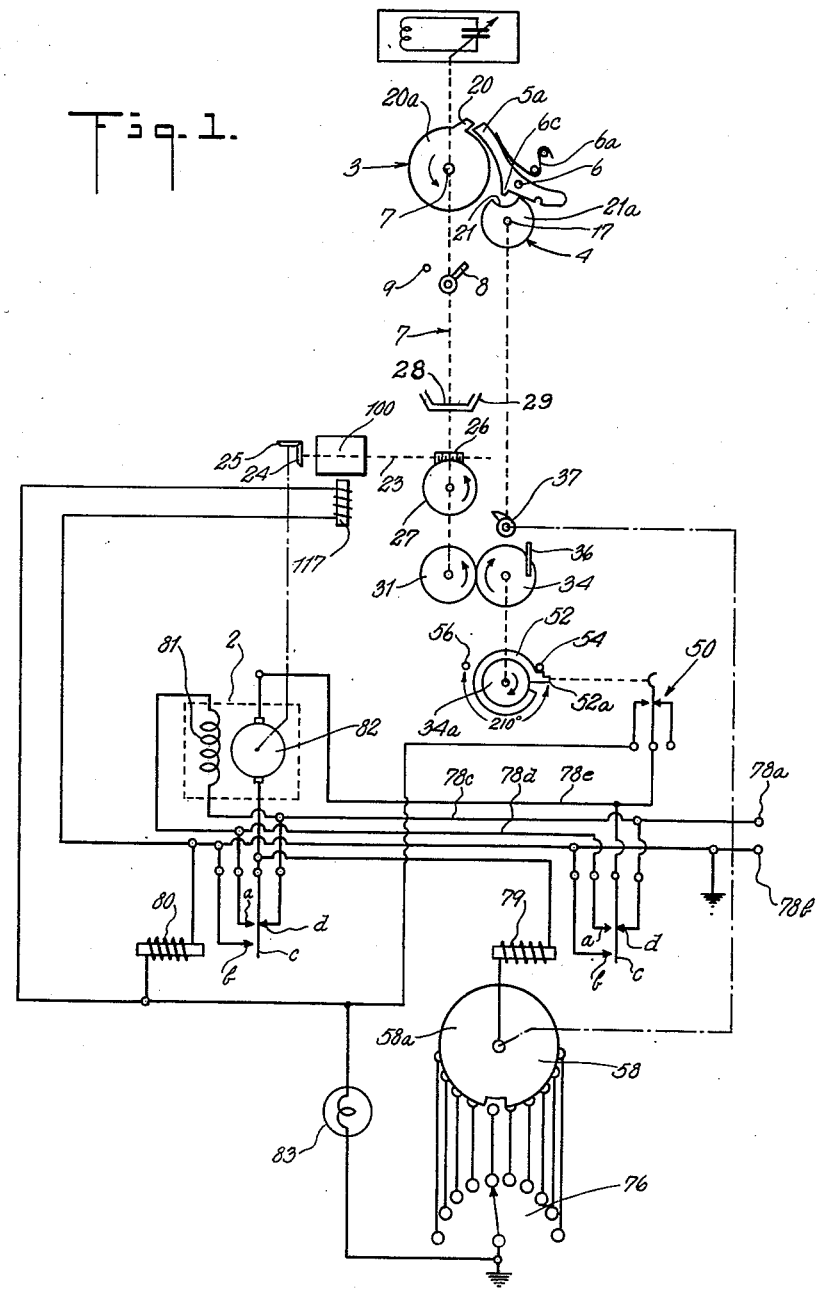
Fig. 1 is a composite electric circuit and mechanical schematic diagram of a control system embodying features of the invention.

Referring to Fig. 1, there is shown in schematic form a radio tuning control system such as described in detail in Reissue Letters Patent Re. 22,574. In Fig. 1, the parts which are identical with the corresponding parts of the said patent bear the same designation numerals and reference may be had to said patent for a detailed explanation of their structure and function.

The motor 2 supplies the driving power for all the movable units of the system. This motor has the usual armature 82 and directional control or field winding 81. The current for the armature and field winding is supplied at terminals 78 and the direction of current flow through winding 81 is controlled by armature $c$ and the reversing contacts $a$, $d$, of relay 89. The circuit of relay 80 however, is under control of an end limit switch 56. Connected in parallel with the winding of relay 89 is a solenoid 117 which controls the special cutout and coupling unit 100 according to the invention. The initial starting of motor 2 is controlled by a relay 79 which in turn is controlled by a manually rotatable switch 76 and a corresponding power driven switch 58. The bank contacts of switches 76 and 58 are directly interconnected as shown. The arrangement is such that the switch 58 acts in the nature of a line finder so that when its commutator 58a is in contact with a grounded bank contact, the relay 79 remains energized. However, when the commutator reaches a position wherein it is disconnected from one of the associated bank contacts, the motor circuit is open and the switch 58 stays put until the next selection is to be made.

The selector mechanism which controls the selective rotation and stopping of the control shaft 7 comprises a stop ring drum 3, which includes a series of stop rings 20a, each ring having a stop shoulder 20. The rings are releasably locked to shaft 7, so that they can be manually preset with the respective shoulders 20 located in different angular orientations around shaft 7 to correspond with the desired selective settings at which said shaft 7 is to be stopped. Associated with the stop ring drum is a cam drum 4 having a series of rotary cams 21a, each having a recess or lowered portion 21 in its periphery. The cams are rigidly locked to shaft 17 which shaft is also connected to the rotating commutator of the switch 58 as indicated in the drawing by the dot-dash line. The cams are so arranged on shaft 7 that the recesses therein are located on a helical path around the cam drum axis. There is one cam for each one of the stop rings. Mounted in cooperative relation with each stop ring and with each cam is a pivoted selector pawl 5a, these pawls being mounted on a common shaft 6. Each of the pawls is provided with a spring 6a which normally tends to rotate the pawl in a counter-clockwise direction as seen in Fig. 1, thus tending to cause the left-hand end of the pawl to lie in the path of the shoulder 20 on the corresponding stop ring. However, in order that any pawl may turn counter-clockwise sufficiently to engage a stop ring shoulder, it is necessary that the portion 6c of the pawl drop into the recess 21 of the corresponding cam. In other words, the pawls cannot move into stopping engagement with their respective stop rings unless the associated cam is positioned with its recess 21 in registry with the portion 6c of the pawl. Also fastened to shaft 7 is a stop arm 8 which rotates with the shaft and is adapted to engage a fixed stop pin 9 to prevent further counter-clockwise rotation of the drum 3 after it has reached its home position. It will be noted that the stop ring drum 3 and the home stop arm 8 are driven from the motor 2 by suitable bevelled gears 24, 25, and through the worm gear 26 and worm wheel 27 and through device 103. However, a slip clutch 28, 29, is provided between the worm gear 27 and the shaft 7 so that when the stop ring drum 3 is restrained against any further counter-clockwise rotation beyond its home position, the gear 27 and gear 31 continue to rotate in a counter-clockwise direction. Gear 31 meshes with a corresponding gear attached to the disc 34, which in turn carries a pin 36. Pin 36 is adapted to engage at one particular point in its revolution a driving dog 37, attached to shaft 17. It is by this means that the cam drum 4 is rotated in a clockwise direction while the stop ring drum 3 is rotating counter-clockwise to its home position. Gear 31 also drives a stop limit control device 52, which has a shoulder 52a, adapted to engage at the limit of its clockwise rotation a fixed stop 56, and is adapted to engage at the limit of its counter-clockwise rotation another fixed stop 54. As described in detail in said Reissue Patent Re. 22,574, when the device 52 rotates clockwise and the shoulder 52a engages stop 56, it effectively disengages the shaft 17 from the gear 31, thus preventing any further rotation of that shaft 17. The shoulder 52a when in its normal position as shown in Fig. 1, is adapted to engage the movable contact of the switch 56, thus normally maintaining open the circuit of relay 89 and solenoid 117 for purposes to be described.

The shoulder 52a is arranged to undergo a rotational movement of 210° in either direction and during this travel, the commutator 58a of switch 58 has sufficient time to seek the particular contact in its contact bank corresponding to the desired angular setting of the cam barrel 4.

For purposes of explanation, it will be assumed that the homing direction of rotation of drum 3 is counter-clockwise and that the armature 82 likewise rotates counter-clockwise. In the homing direction, motor 2 drives worm gear 27 through gears 24 and 25, shaft 23, and worm 26 in a counter-clockwise direction. Gear 31 and clutch element 28 are simultaneously rotated in the same direction, as are the shaft 7, the stop arm 8 and the stop ring drum 3. When stop arm 8 engages stop 9, the drum 3 is in its homing position. At the same time, gear 31 drives gear 34 clockwise, causing pin 36 to move in the clear through an arc of 210° while the element 52 follows the movement of gear 34 also through an arc of 210°. Even though shaft 7 has been restrained against further counter-clockwise direction, motor 2 continues to drive gears 27, 31 and 34, however with the clutches 28, 29 and 34a slipping. As a result, pin 36 engages the dog 37 to drive shaft 17 in a clockwise direction, likewise causing clockwise rotation of the commutator of switch 58 and the cam drum 4. When the commutator reaches a position wherein its recess 58a registers with the previously grounded contact 58b, the previously closed circuit of relay 79 is opened, in turn opening the circuit through the motor armature 82. If however, the motor 2 has sufficient inertia or is one which does not stop instantaneously on the opening of its armature circuit, it will continue to coast and may cause additional undesired movement of the commutator of switch 58 and of the cam barrel 4. It is important therefore, to make sure that as soon as the motor circuit is opened, any further substantial rotation of the shaft 17 be prevented. For this purpose, the device 100 is arranged so that as soon as its solenoid 117 is energized, it automatically disconnects the motor shaft from the shaft 23. As a result of this operation, the cam drum 4 has been selectively positioned so that the appropriate recess 21a is in registry with the selected pawl 5a which is therefore rotated in a counter-clockwise direction by its spring 6b, thus projecting its left-hand end into the path of the shoulder 20 on the corresponding stop ring.

It should be observed that the normal starting circuit for the motor is controlled by the manually settable switch 76. When this switch is moved to a contact representing a new setting of the mechanism, it closes a circuit from ground through the commutator of switch 58, thence through the winding of relay 79, armature c and back-contact d of relay 80, and thence over the power supply conductor to the power supply source. As soon as relay 79 operates, it closes a circuit from the power supply terminal 78a, conductor 78c, field winding 81, conductor 78d, front contacts a and b and armature c of relay 79 to the power supply terminal 78b. This causes the motor to rotate in a counter-clockwise direction.

As soon as the desired pawl 5a has been selected as above described, and as soon as the commutator of switch 58 reaches the previously selected contact, the above described circuit through the relay 79 is opened. In the meanwhile, the end limit switch 50 has been closed so as to complete a circuit through its contacts a and b. Consequently, when the relay 79 is deenergized, a circuit is closed and traceable from terminal 78a, back contact d and armature c of relay 79, conductor 78e, contacts b and a of switch 50, winding of relay 80 to the terminal 78b. Also closed in parallel with the winding of relay 80 is the winding of solenoid 117. Within a very short interval after the energization of solenoid 117, it causes the disconnection of the motor shaft from the shaft 23 as will be subsequently described in connection with Figs. 3 to 5. Consequently, even if the motor continues to coast after its circuit is opened, the shafts 7 and 17 are not subjected to any further rotation.

As soon as relay 80 operates as above described, it reverses the direction of current flow through field winding 81. Thus after the motor is brought to rest, it reverses its direction of rotation. As a result of the operation of the device 100, as soon as the motor starts to reverse, it reconnects the motor shaft to the shaft 23, thus causing the drum 3 to rotate in a clockwise direction. However as a result of the action of the clutch 34a, and as described in said reissue Patent Re. 22,574, this reverse rotation of the motor does not effect any change in the previous setting of the shaft 17. As a result, the pin 36 rotates in a counter-clockwise direction away from the dog 37, leaving switch 58 and the cam drum 4 in their previously selected positions. The reverse movement of member 52 is limited to 210° by engagement of the shoulder 52a with pin 54 and when the element 52a reaches this end limit, it opens the circuit between contacts a and b of switch 50, thus opening the power supply circuit to the motor. However, during this limited reverse movement, clutch elements 28 and 29 rotate clockwise until the stop shoulder 20 on the appropriate stop ring 20a engages the previously selected pawl 5a, thus stopping any further clockwise movement of the stop ring drum. For the remainder of the 210° range of movement of the member 52a, clutch elements 28 and 29 slip and only gears 27, 31 and 34 together with clutch ring 52 are driven. When the cycle is completed, the motor circuit is finally opened and the drum 3 remains in its selected position, causing the device 57, which may for example be a tuning condenser or the like, to be selectively positioned.

Referring more particularly to Figs. 1 and 2, the gear 24 is freely rotatable on the shaft 23. The cup-like member 103 is fixedly mounted on shaft 23 by any suitable means, such as for example pin 104, and the eccentric dog 105 is affixed on gear 24 by some suitable means such as rivets 106. Pawls 107 and 108 are pivotally mounted on member 103 by rivets 109 and 110 respectively, these pawls being held against the periphery of the eccentric dog 105 by spring 111 and having ratchet portions 112 and 113 respectively which are adapted to engage the lug 114 of the eccentric dog 105. In the position shown in Fig. 3, clockwise rotation of eccentric dog 105 will cause immediate clockwise rotation of cup-like member 103 and shaft 23, but without causing pawl 108 to rotate around its pivot 110. If eccentric dog 105 is rotated counter-clockwise, lug 114 will be brought into driving engagement with ratchet portion 112 of pawl 107, whereupon member 103 and shaft 23 will be rotated counter-clockwise. The arm 115 of pawl 108 extends through an opening 116 in member 103 and outwardly therefrom, and provides a means for rotating pawl 108 counter-clockwise around its pivot 110 to release lug 114 from engagement with ratchet portion 113 of pawl 108, thereby decoupling the gear 24 from shaft 23. Solenoid 117 controls the stopping and reversal of the driven shaft 23. The shaft stop means includes the relay operated clapper 118 pivotally mounted at 119 and the clapper operated latch 120 pivotally mounted at 121. As shown in Fig. 3, spring 122 normally holds latch 120 against the toe 123 of clapper 118. Solenoid 117 is mounted in proper spaced relation with respect to cup-like member 103 by fixedly securing it to any suitable stationary bracket on which the latch 120 is also pivotally mounted at 121. The upright 125 attached to bracket 124, provides means for pivotally mounting the clapper 118.

When it is desired to stop the rotation of shaft 23, solenoid 117 is energized as described in connection with Fig. 1, causing clockwise rotation of clapper 118 around its pivot 119. This causes toe 123 to rotate latch 120 counter-clockwise around its pivot 121 and to be placed in the path of travel of the extending arm 115 of pawl 108. When the clockwise rotation of shaft 23 and member 103 brings pawl 108 into contact with latch 120, the latch engages the lip portion 126 of that pawl and because of its engagement with the rotating lug 114 rotates the pawl 108 in a counter-clockwise direction around its pivot 110, causing lug 114 to be disengaged therefrom. The engagement of latch 120 and lip portion 126 of pawl 108, causes member 103 and shaft 23 to stop instantaneously, but the driven gear 24 continues freely to drive the eccentric dog 105.

Fig. 4 shows the member 103 and shaft 23 in the stopped position above described with latch 120 and pawl 108 engaged, and eccentric 105 in position to rotate freely in a clockwise direction. This freedom of rotation is assured for two reasons: First, the sloped shape of ratchet portion 112 of pawl 107 allows the rotating lug 114 to force it up and out of its path of rotation against the force of spring 111. Second, the latch 120 continues to hold the lip portion 126 of pawl 108 out of the path of rotation of lug 114. Opening 116 is of such length that it does not restrict the rotational movement of pawl arm 115, and the actual length of this opening may be determined from the extreme positions of pawl arm 115 shown in Figs. 2 and 3.

Fig. 5 shows the relation of the pawls with the eccentric dog drive and latch 120, when the eccentric drive is engaged to drive the shaft 23 in a counter-clockwise direction. When gear 24 and eccentric 105 have stopped clockwise rotation and started counter-clockwise rotation, immediately that they start such reverse rotation, lug 114 engages the inclined face 113 and rotates pawl 108 counter-clockwise thus allowing latch 120 to restore to its normal position as shown in Fig. 3. The eccentric dog 105 shortly thereafter engages ratchet portion 112 of pawl 107 as shown in Fig. 5, causing counter-clockwise rotation of shaft 23 and member 103. Spring 122 immediately forces latch 120 against the toe 123 of clapper 118. This moves the latch out of the path of rotation of arm 115 and allows that arm to be freely rotated.

This unobstructed path of rotation is made possible by the eccentricity of the eccentric 105. When the eccentric is drivingly engaged for clockwise rotation of the shaft 23 (Fig. 3), the pawl 108 is extended toward latch 120 a correct amount for the lip portion 126 of pawl arm 115 to engage the latch 120 should solenoid 117 be energized. When, however, the eccentric is drivingly engaged for counter-clockwise rotation (Fig. 5), the eccentricity of the eccentric has caused pawl 108 to undergo counter-clockwise rotation and ratchet 113 is held against the "high" part of the cam, thereby holding the lip 126 of arm 115 nearer shaft 102 and out of the path of latch 120. This allows continuous counter-clockwise rotation of the shaft independent of the operation of solenoid 117 until its counter-clockwise rotation is terminated by the stopping of the gear 24. In other words, continuous counter-clockwise rotation of shaft 23, independent of the operation of solenoid 117, is possible because of the decreased radius of rotation of arm 115 when it is being rotated in a counter-clockwise direction.

Summarizing the above, the sequence of operations is as follows:

1. A new channel is selected by manual positioning of the brush of switch 76 on the appropriate bank contact.

2. The drive motor 2 receives power through relay 79 and drives the drum 3 in the "home" direction.

3. Sometime after the drum 3 reaches its "home" position, the cam drum 4 and the selector switch 58 advance to the selected position to select the proper pawl 5a, and thereupon opening the energizing circuit of relay 79.

4. Since the limit switch 52 has closed its contacts a and b, relay 80 and the solenoid 117 become energized.

5. The energization of solenoid 117 in the shaft control unit 100 (Figs. 2 to 5) immediately disengages shaft 23 from gear 24 while relay 80 reverses the polarity of the current applied to the armature 81, causing motor 2 to slow down, come to a stop, and then reverse its direction of rotation. However, because of the inertia of the motor armature, several revolutions are required before the motor can completely come to rest and begin rotation in the opposite direction. Because of the shaft reversing action of the control unit 100, the shaft 23 is physically disengaged from the gear 24 allowing the mechanism to stop substantially immediately, or at least in less than one-half revolution of shaft 23 after completion of the pawl selection cycle.

6. The motor 2 may overrun several revolutions without driving shaft 23, but the first revolution in the reverse direction again engages shaft 23 with gear 24 causing the selector mechanism to be rotated in reverse direction.

7. Rotation of the drum 3 in the reverse direction continues until the shaft 7 to be controlled is stopped at the desired position and the limit switch 52 opens contacts a and b.

8. Relay 80 is then deenergized and the motor 2 stops completely the selective operating cycle.

While one particular and preferred embodiment has been disclosed, it will be understood that various changes and modifications may be made therein without departing from the spirit and scope of the invention.

What is claimed is:

1. An arrangement for automatically controlling the angular orientation of a selector shaft, comprising a selector device rotatable with said shaft, a motor driven shaft for rotating said device in one direction to a home position and for rotating said device in the opposite direction to effect a desired selective setting, an eccentric dog rotatable with the motor driven shaft, a pair of pawls rotatable with said device, one of said pawls engageable with said dog to couple said device to the motor driven shaft when the latter is rotating in one direction, the other of said pawls engageable with said dog to couple said device to the motor driven shaft when the latter is rotating in the opposite direction, and an electromagnet having an armature which in one position engages one of said pawls to provide a positive stop for the rotation of said device and for simultaneously decoupling said one of said pawls from driving engagement with said dog.

2. An arrangement for automatically controlling the angular orientation of a selector shaft, comprising first and second rotatable selector devices whose conjoint settings determine said orientation, the first device being rotatable with said selector shaft, a motor driven power shaft for rotating said first device to a home position and for rotating said second device until it arrives at a selected stopping position, a member rotatable with said first device for coupling it to said motor driven shaft, a motor control circuit, means automatically effective to decouple said member from said motor driven shaft when said second device reaches its selected stopping position and for simultaneously opening and reversing the motor control circuit to allow the motor driven shaft to coast to a position of rest before it reverses its direction of rotation and without affecting the said selected stopping position of said second device, and means effective within one revolution of the motor after said motor reversal for automatically recoupling said first device to said motor driven shaft to rotate said first device to a selected stopping position as determined by the said selected stopping position of said second device, the last-mentioned means comprising a support member rotatable as a unit with said selector shaft, a dog rotatable as a unit with said motor, a toothed pawl pivotally attached to said support and arranged to be interposed in driving relation with said dog only during said reverse rotation of the motor.

3. An arrangement according to claim 1, in which motor control relay means are provided for opening and closing the motor circuit and for controlling the direction of the motor rotation, and electrical circuit connections are provided between said relay means and said electromagnet for energizing said electromagnet simultaneously with the said opening of the motor circuit to stop said device within one complete revolution of the motor shaft after the said circuit opening, and for positively driving said device in the reverse direction within one complete revolution after the said motor starts its reverse rotation.

4. An arrangement for automatically controlling the angular orientation of a shaft, comprising a selector device rotatable with said shaft, a reversible electric motor for rotating said device in opposite directions, electric circuit means responsive to the initiation of a selecting cycle to start said motor rotating to drive said device to a home position and thereafter to open the motor circuit to reverse the motor rotation and to drive said device to its selected position, a rotatable coupling mechanism for connecting said device to said motor, an electromagnet stationarily mounted with respect to said coupling mechanism, electric circuits for energizing said relay and said electromagnet simultaneously, said coupling mechanism having a pair of shiftable coupling elements one for coupling the motor to said device to rotate it in one direction and the other for coupling said device to said motor to rotate it in the opposite direction, said electromagnet having an armature controlled stop member which in one position engages one of said coupling elements to decouple said device from said motor and to positively stop said device within one revolution of the motor after its circuit is opened, said other coupling element being effective to cause rotation of said device within one revolution of the motor after it starts its reverse rotation.

5. An arrangement according to claim 4, in which said coupling mechanism comprises a support rotatable as a unit with said device, an eccentric dog rotatable with the motor shaft, said coupling elements being in the form of a pair of pawls pivotally mounted on said support and engageable with said dog, one of said pawls having a projection for engagement with said stop member, means normally holding said stop member out of the path of said projection, said electromagnet when energized interposing said stop member in the path of said projection to effect said positive stopping of said support and its decoupling from the motor.

6. An arrangement according to claim 4, in which said coupling mechanism comprises a support rotatable as a unit with said device, an eccentric dog rotatable with said motor, said coupling elements being constituted of a pair of pawls pivotally mounted on said support and movable into and out of engagement with said dog, one of said pawls having a projection, spring means normally tending to hold said pawls in the path of said dog, said electromagnet when energized interposing said stop member in the path of said projection and thereby positively stopping further rotation of said support while decoupling said support from the motor, said dog engaging the other pawl to begin rotating said support within one revolution of the motor after the beginning of its reverse rotation.

7. An arrangement for automatically controlling the angular orientation of a selector shaft, comprising a stop ring drum rotatable as a unit with said shaft, a plurality of selector pawls cooperating with said drum, a rotatable cam drum for selectively positioning one of said pawls with relation to a corresponding stop ring in said stop ring drum, a common driving motor for said stop ring drum and said cam drum, a line finder switch rotatable as a unit with said cam drum, said switch being driven by said motor, a coupling mechanism between said motor and said selector shaft and including a pair of pivotally mounted coupling elements and a rotatable dog, an electromagnet for controlling said coupling mechanism, a motor start relay to start said motor operating in one direction to drive said selector switch and to drive said cam drum and also to rotate said stop ring drum to a home position, a motor reversing relay for controlling the direction of the motor rotation, means responsive to the selective setting of said cam drum to cause said start relay to open the motor circuit and to operate said reverse relay to close the motor reverse circuit and also to operate said electromagnet, a shiftable latch member controlled by said electromagnet and responsive to the energization of said electromagnet for engaging one of said coupling elements to stop said selector shaft within one revolution of the motor after the opening of the motor circuit, said other pawl engaging said dog to begin rotating said selector shaft in a reverse direction within one revolution of the beginning of the reverse rotation of said motor.

8. An arrangement for automatically setting a shaft and being of the type which comprises first and second rotatable selector devices whose conjoint selective settings determine the shaft setting, the first device being rotatable to a home position at the beginning of each selection cycle while the second device is rotated to a selective stopping position to prepare a final stopping position for the first device when the latter reverses its direction of rotation, a common motor driven shaft for rotating both said devices, a reversible electric motor for said driven shaft, motor control circuits for effecting rotation of said driven shaft first in one direction and then in the opposite direction, mechanism normally coupling both said devices to said motor driven shaft, electric switch means effective when said second device reaches said selected stopping position for reversing the motor rotation, means responsive to the operation of said switch means for causing said coupling mechanism to decouple both of said devices from said motor driven shaft while allowing said shaft to coast to rest, said coupling mechanism comprising a pair of pawls rotatable as a unit with said first device, a dog rotatable with the motor driven shaft, and electromagnetic means for selectively moving one of said pawls out of coupling engagement with said dog.

9. An arrangement according to claim 8, in which said dog is eccentrically mounted with respect to said pawls one of said pawls having a tooth which is engageable in driving relation with said dog only during one direction of rotation of said shaft, the other pawl having a tooth engageable in driving relation with said dog only during the reverse rotation of said shaft, said electromagnet being operatively connected with a shiftable latch which is normally out of the path of one of said pawls and is movable into stopping engagement with said one of said pawls when said electromagnet is energized.

ROSS S. PYLE.

REFERENCES CITED

The following references are of record in the file of this patent:

UNITED STATES PATENTS

| Number | Name | Date |
| --- | --- | --- |
| 336,044 | Turner | July 10, 1888 |
| 2,085,442 | Newell | June 29, 1937 |
| 2,114,068 | Plensler | Apr. 12, 1938 |
| 2,161,563 | Doty | June 6, 1939 |
| 2,231,156 | Claytor | Feb. 11, 1941 |
| 2,285,415 | Collins | June 9, 1942 |

FOREIGN PATENTS

| Number | Country | Date |
| --- | --- | --- |
| 418,398 | Germany | Sept. 4, 1925 |